No. 12,320. REISSUED FEB. 21, 1905.
F. S. SEAGRAVE.
AERIAL LADDER.
APPLICATION FILED SEPT. 24, 1904.
2 SHEETS—SHEET 1.
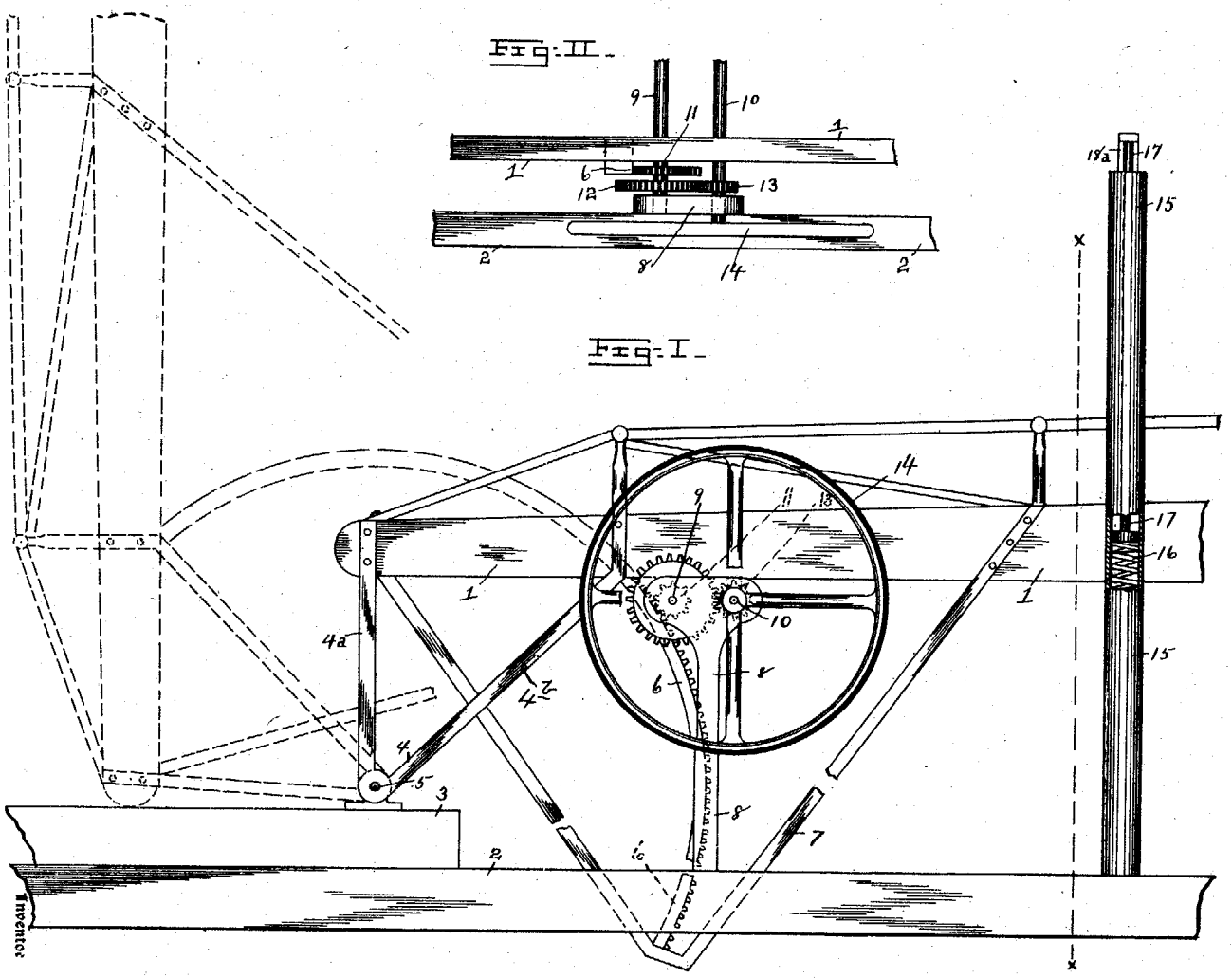
Inventor
Frederic S. Seagrave.
Witnesses
H. A. Bacon.
H. D. Crossbeck.
By
E. N. Bond Attorney
PHOTO-LITHOGRAPHED AT GAGELTY & WILLIAMS LITHO. & PTG. CO. NEW YORK.

No. 12,320. REISSUED FEB. 21, 1905.
F. S. SEAGRAVE.
AERIAL LADDER.
APPLICATION FILED SEPT. 24, 1904.
2 SHEETS—SHEET 2.
FIG. III.
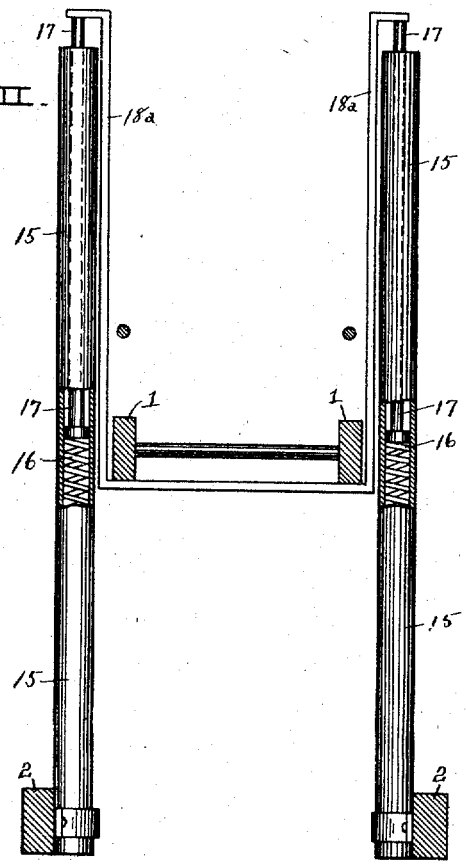
Inventor
Frederic S. Seagrave.
Witnesses
F. A. Spencer.
H. D. Crossbeck.
By E. H. Bond
Attorney
PHOTO-LITHOGRAPHED BY SACKETT & WILHELMS LITHO. & PTG. CO. NEW YORK.

No. 12,320. Reissued February 21, 1905.

UNITED STATES PATENT OFFICE.

FREDERIC S. SEAGRAVE, OF DETROIT, MICHIGAN.

AERIAL LADDER.

SPECIFICATION forming part of Reissued Letters Patent No. 12,320, dated February 21, 1905.

Original No. 691,878, dated January 28, 1902. Application for reissue filed September 24, 1904. Serial No. 226,003.

*To all whom it may concern:*

Be it known that I, FREDERIC S. SEAGRAVE, a citizen of the United States, formerly of Columbus, in the county of Franklin and State of Ohio, now residing at Detroit, in the county of Wayne and State of Michigan, have invented a new and useful Improvement in Aerial Ladders, of which the following is specification.

My invention relates to the improvement of aerial ladders; and the object of my invention is to provide a simple and readily and easily operated mechanism for elevating an aerial-ladder body from a truck. This object I accomplish in the manner illustrated in the accompanying drawings, in which—

Figure 1 is a side elevation of a portion of a ladder-body, showing my improvement in connection therewith and showing in dotted lines a portion of the ladder when the same is elevated. Fig. 2 is a plan view of the gear mechanism, which I employ in the manner hereinafter described; and Fig. 3 is a section on line *x x* of Fig. 1.

Similar numerals refer to similar parts throughout the several views.

1 represents the parallel legs or side pieces of a ladder, which is normally supported in a substantially horizontal position from a truck, of which 2 represents portions of the sills, and 3 a suitable turn-table.

The ladder-body 1 has its rear portion pivotally mounted upon the truck or turn-table through the medium of side bearing or supporting frames 4, each of the latter being in the nature of an angular frame comprising diverging arms $4^a$ and $4^b$, the arm $4^a$ when the ladder is in its horizontal position extending vertically upward from the turn-table and having its upper portion secured to the rear end portion of the ladder-leg, and the arm $4^b$ inclining forwardly and upwardly and having its upper portion likewise secured to said ladder-leg, as shown in the drawings. These supporting-frames 4 at the junction of their arms $4^a$ and $4^b$ are suitably journaled or pivoted at 5 on the turn-table 3. On opposite sides of the rear portion of the ladder-body 1 I secure the upper ends of downwardly-extending and forwardly-curved rack bars or segments 6, the lower ends of the latter preferably being united with the legs of the ladder through the medium of rearwardly and forwardly inclined brace-bars 7. Rising from the sills 2 of the truck are bearing-standards 8, in the upper end portions of which are mounted transverse shafts 9 and 10. Upon the shaft 9 on each side of the ladder is carried a pinion-wheel 11 and on the other side of each of the latter a gear-wheel 12. Upon the shaft 10, opposite each of the wheels 12, is mounted a pinion 13, the teeth of which mesh with those of the gear-wheel 12, while upon the outer sides of the standards 8 said shaft 10 carries large hand or balance wheels 14. As indicated in the drawings, the teeth of the pinion-wheels 11 mesh with the teeth of the rack-bars 6, said pinions being when the ladder is in its normal or lowered position in engagement with the teeth of the upper ends of said rack-bars.

Rising from the sills 2 of the truck at points in front of the gear mechanism above described are vertical tubes 15, one on each side of the ladder-body. As indicated more clearly in Fig. 3 of the drawings, each of these tubes contains a vertically-arranged spring 16, which is adapted to be compressed into the lower half or portion of the tube by vertical plungers 17, which enter said tubes from the upper end thereof. The upper ends of these plungers are connected by the outturned upper ends of the vertical side bars $18^a$ of a yoke or substantially U-shaped frame 18, which extends downward between the tubes 15 and the horizontal base portion of which forms a seat or rest for the legs 1 of the ladder.

In the operation of elevating the ladder to the position shown in dotted lines in Fig. 1 it is obvious that the rear end portion of the ladder must swing toward the truck in the arc of a circle of which the pivot-point 5 is the center. This swinging or lifting movement of the ladder may be accomplished by the rotation of the hand or balance wheels 14, which through their gear connections with the pinions 11 and the engagement of the latter with the teeth of the racks 6 results in said racks, together with the ladder, being swung upward and rearward. It is obvious, however, that when the gear mechanism described is alone employed for the purpose of raising the ladder the greatest power is necessarily expended in lifting said ladder until it is at a sufficient angle to cause its lower end to gravitate toward the truck. In order to facilitate the raising of the ladder to this degree, I have provided the springs 16, located in proximity to the pivot of the ladder and which are normally retained under endwise compression by the weight of the ladder and which, therefore, exert a desirable degree of upward spring-pressure on said ladder said springs thus affording an auxiliary lifting power which greatly lessens the labor of elevating the ladder-body.

By arranging the springs on the truck in the manner described they serve the additional function of providing a cushion or yielding support for the ladder as it is being raised or lowered.

From the construction and operation decribed it will be seen that not only are superior means provided for raising the ladder by hand-power mechanism, but that said ladder is so pivoted or mounted upon the truck as to cause its lower end portion to swing in the arc of a circle during the raising or lowering operation and that the raising operation is assisted both by the action of the springs and the power of gravity.

Having now fully described my invention, what I claim, and desire to secure by Letters Patent, is—

1. In an aerial ladder, the combination with a ladder-body and a frame intermediate of the ladder and truck, said ladder having a pivotal connection with the truck through said frame, to cause the lower end portion of the ladder to swing in the arc of a circle toward the truck as the ladder is elevated, of springs supported on the truck to form a yielding support for the ladder and disposed out of vertical line with the pivot of said ladder, said springs being disposed relatively to the ladder to be under endwise compression by the ladder when the ladder is lowered, and to exert a lifting influence on the ladder by endwise expansion in elevating the ladder, substantially as described.

2. In an aerial ladder, the combination with a ladder-body having its rear or lower end pivotally connected with a truck, of vertically-arranged springs on opposite sides of said ladder, plungers bearing upon said springs and a yoke-frame depending from said plungers, said yoke-frame embracing said ladder, substantially as specified.

3. The combination with a truck, and a pivoted ladder thereon, of springs mounted on the truck out of vertical alinement with and in proximity to the pivot of the ladder and disposed relatively to the ladder to be held under endwise compression by the ladder and to aid by endwise expansion, in elevating the ladder, and forming a yielding support therefor as the ladder is being lowered, substantially as set forth.

4. The combination with a truck, and a pivoted ladder thereon, of springs mounted on the truck and disposed relatively to the ladder to be held under endwise compression when the ladder is down, and arranged at a distance from but in proximity to the pivot of the ladder to assist, by endwise expansion, to raise the ladder, and to form a yielding support therefor as the ladder is being raised or lowered, and means inclosing said springs, substantially as and for the purposes specified.

FREDERIC S. SEAGRAVE.

In presence of—
NATHAN NEWSTEAD,
CHESTER C. RIESTER.